US010389684B2

(12) United States Patent
Polcha, Sr. et al.

(10) Patent No.: US 10,389,684 B2
(45) Date of Patent: Aug. 20, 2019

(54) SYSTEM AND METHOD OF COUPLING A HOME AREA NETWORK WITH THE CLOUD CREATING A HIGHLY SECURE AND SCALABLE PRIVATE TOPOLOGY

(71) Applicants: Andrew John Polcha, Sr., Lovettsville, VA (US); Michael Patrick Polcha, Sr., Lovettsville, VA (US)

(72) Inventors: Andrew John Polcha, Sr., Lovettsville, VA (US); Michael Patrick Polcha, Sr., Lovettsville, VA (US)

( * ) Notice: Subject to any disclaimer, the term of this patent is extended or adjusted under 35 U.S.C. 154(b) by 35 days.

(21) Appl. No.: 15/863,860

(22) Filed: Jan. 5, 2018

(65) Prior Publication Data

US 2018/0191678 A1 Jul. 5, 2018

Related U.S. Application Data

(60) Provisional application No. 62/442,531, filed on Jan. 5, 2017.

(51) Int. Cl.
*H04L 29/06* (2006.01)
*H04L 12/46* (2006.01)
*H04L 12/24* (2006.01)

(52) U.S. Cl.
CPC ...... *H04L 63/0227* (2013.01); *H04L 12/4604* (2013.01); *H04L 12/4641* (2013.01); *H04L 63/0272* (2013.01); *H04L 41/0886* (2013.01)

(58) Field of Classification Search
CPC ............ H04L 63/0227; H04L 12/4604; H04L 12/4641; H04L 63/0272; H04L 41/0886
See application file for complete search history.

(56) References Cited

U.S. PATENT DOCUMENTS

| | | | | |
|---|---|---|---|---|
| 9,479,513 | B1* | 10/2016 | Jenkins | G06F 21/53 |
| 2006/0112076 | A1* | 5/2006 | Burris | G06F 16/353 |
| 2010/0046531 | A1* | 2/2010 | Louati | H04L 41/0806 370/401 |
| 2015/0357133 | A1* | 12/2015 | Keirstead | H01H 23/04 200/339 |
| 2016/0040903 | A1* | 2/2016 | Emmons | H04L 67/1078 700/278 |
| 2017/0005515 | A1* | 1/2017 | Sanders | H02J 3/381 |
| 2017/0093915 | A1* | 3/2017 | Ellis | H04L 63/20 |
| 2017/0116846 | A1* | 4/2017 | Wengrovitz | G08B 25/10 |
| 2017/0208039 | A1* | 7/2017 | Godfrey | H04W 76/12 |
| 2017/0317901 | A1* | 11/2017 | Agrawal | H04L 43/08 |
| 2017/0339070 | A1* | 11/2017 | Chang | H04L 47/829 |

* cited by examiner

*Primary Examiner* — Ghodrat Jamshidi
(74) *Attorney, Agent, or Firm* — Doster Greene, LLC (57) ABSTRACT

A device, system and method, according to various embodiments, can include, for example, a hybrid cloud network, one or more personal cloud virtual LANs, and a home area network. The hybrid cloud network can be configured to provide public access and private access. The one or more personal cloud virtual LANs are provided at an overlapping segment of the hybrid cloud network to provide privacy within the hybrid cloud network. The home area network can include a single purpose computer configured as a gateway for the hybrid cloud network and configured to establish a site-to-site secure connection with the one or more personal cloud virtual LANs.

1 Claim, 11 Drawing Sheets

SYSTEM AND METHOD OF COUPLING A HOME AREA NETWORK WITH THE CLOUD CREATING A HIGHLY SECURE AND SCALABLE PRIVATE TOPOLOGY

REFERENCE TO RELATED APPLICATION

This application claims benefit to U.S. Provisional Patent Application Ser. No. 62/442,531, which was filed on Jan. 5, 2017. The subject matter of the earlier filed application is hereby incorporated by reference.

FIELD OF THE INVENTION

The present invention relates to remote computer configuration, and more particularly to a system and method for automatically configuring a remote computer for establishing a secure connection to a specific SD-WAN profile configuration on a secure server hosted on a private cloud-based network. The present teachings relate to devices and methods for providing a secure network topology hosting applications and services with aggregate communication elements; and creating client/server IP-based services combining the private cloud with the open Internet over an Internet-based Virtual Private Network (VPN).

BACKGROUND OF THE INVENTION

Recently, the government voted in favor to repeal rules meant to safeguard consumer data from being collected by Internet Service Providers (ISPs) without a user's knowledge or consent. These rules, originally adopted by the Federal Communications Commission (FCC) required broadband ISPs to protect the privacy of their customers. These rules implemented the privacy requirements by giving consumers of broadband the tools they needed to make informed decisions about how their information was used and shared by their ISPs.

Without these privacy requirements, ISPs can now "sell" their customer's Internet traffic patterns and behavior (web, data, total usage etc.) to "third-party" service providers. In one example, on-line shopping within a single household can be sold to other service providers by that household's ISP. "Where they shop" (online), "What is purchased" (online), analytics about websites visited, internet services used, how much time spent online etc. (traffic) is all susceptible to be sold to exploit more revenue selling customers' analytics for ISPs.

Regardless of the recent regulatory change, the public debate rages on as to whether ISPs should be regulated as either a utility or an information service by the FCC. This debate has become even more relevant with Internet enabled smart home devices becoming more ubiquitous. One benefit of these smart devices is the convenience that allows users to remotely access and control these devices. However, one disadvantage associated with smart devices is the potential vulnerability to cyberattacks that may allow unauthorized access to the devices. A cybercriminal may breach the smart device's security and take control of the device or entire network and/or allow the attacker to monitor and watch the user's home.

In the midst of numerous technical and ephemeral regulations on Internet data, it may be difficult for consumers to ascertain with certainty the current state of consumer data privacy protections. As policy attempts to strike a balance regarding Internet privacy for the consumer; there is a need for consumers to take proactive measures to safeguard their practices, behaviors and devices to meet next generation infrastructures. Further, there is a need for a system and method that enables users to control the amount of access allotted by smart devices and their associated networks so that the users can control their environments. There is a need for a system and method that provides users the ability to configure a personal cloud LAN to create a manage service to control access to their personal data regardless of the government regulations.

SUMMARY OF THE INVENTION

The present invention may satisfy one or more of the above-mentioned desirable features. Other features and/or aspects may become apparent from the description which follows.

A system and method according to various embodiments can automatically configure a remote computer to establish a direct, two-way connection through the public Internet to a Wide Area Network (WAN) settings and profile within a Virtual Private Network (VPN) server contained within a cloud-based network. The WAN profile can be created, managed and controlled by automated software creating a Software Defined Wide Area Network (SD-WAN) solution for server automated server management contained within a cloud-based network.

According to the system and method, a software configuration generator can determine information necessary for the remote computer to establish the VPN connection, and can generate an executable file (client connection program) to be run on the remote computer. When run on the remote computer, the executable file can automatically configure the remote computer to enable it to establish the connection with the SD-WAN profile matching the connection properties of the client connection program.

Each SD-WAN profile can have unique and often complex connection properties that must be inherently present and known and configured within the client connection program in order to establish a successful connection to that specific SD-WAN profile. The software generator can configure the SD-WAN profile within the VPN server simultaneously creating an executable client connection program to match the unique connection properties inherent to the SD-WAN profile. Once the client connection program is run on a remote computer, a secure connection between the remote computer and the VPN server via the SD-WAN profile on the VPN server can be established.

The above features and advantages, and other features and advantages, of the present technology are readily apparent from the following detailed description of embodiments and appended claims, when taken in connection with the accompanying drawings.

BRIEF DESCRIPTION OF THE DRAWINGS

The skilled artisan will understand that the drawings described below are for illustrative purposes only. The drawings are not intended to limit the scope of the present teachings in any way.

DETAILED DESCRIPTION OF VARIOUS EMBODIMENTS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" mechanism +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Various embodiments relate to remote computer configuration, and more particularly to a system and method for automatically configuring a remote computer for establishing a secure connection to a specific SD-WAN profile configuration on a secure server hosted on a private cloud-based network. The system and method described herein provide a secure network topology hosting applications and services with aggregate communication elements. The system and method create client/server IP-based services by combining the private cloud with the open Internet over an Internet-based Virtual Private Network (VPN).

Various embodiments of the system and process described herein enable consumers to take proactive measures to safeguard their practices, behaviors and devices to meet next generation infrastructures.

Various embodiments provide a system and method that enables users to control the amount of access allotted by smart devices and their associated networks so that the users can control their environments.

Various embodiments provide a system and method that provides users the ability to configure a personal cloud LAN to create a managed service to control access to their personal data regardless of the government regulations.

Figure 1:
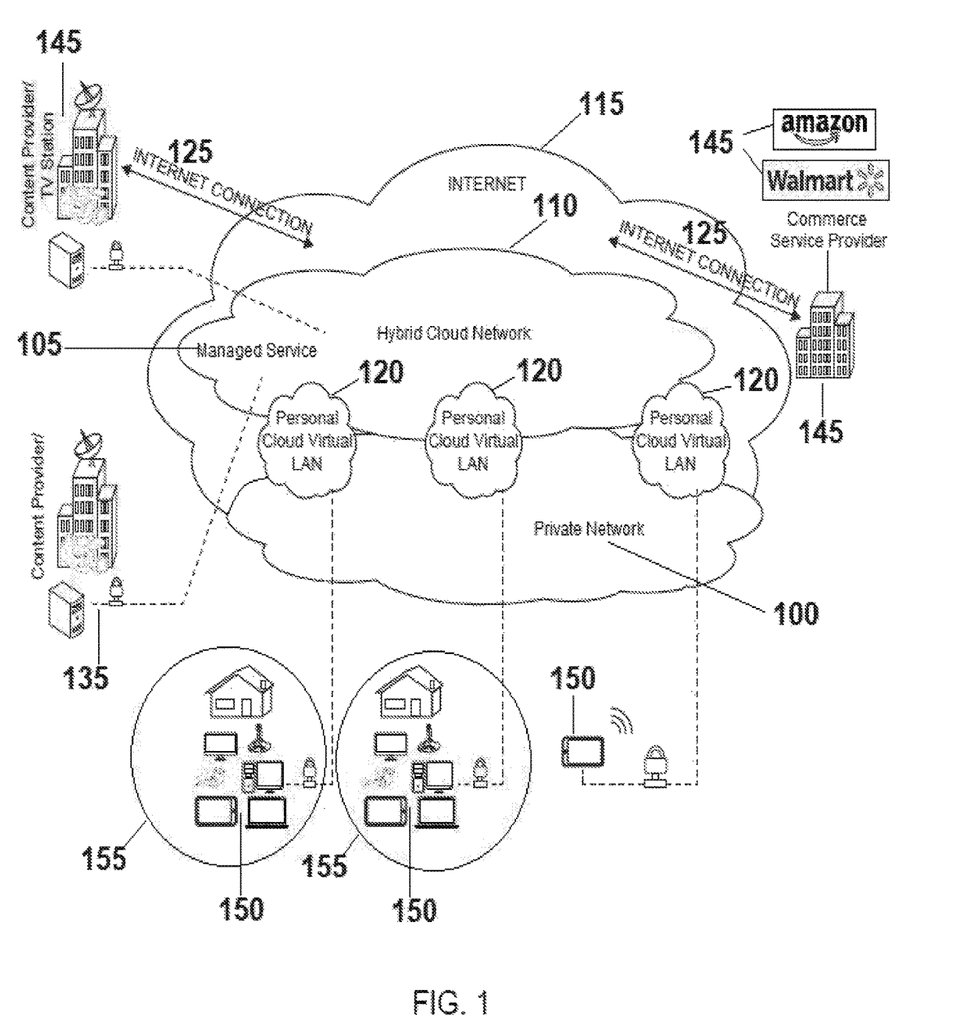
FIG. 1 is a diagram illustrating a configuration example of a private cloud infrastructure in accordance with the present teachings.

An exemplary embodiment of a general overview of a network environment 100 that can be used, for example, to provide a highly secure and scalable private topology according to the present teachings is illustrated in FIG. 1. Within the network environment 100, FIG. 1 illustrates a diagram of an exemplary infrastructure of a hybrid cloud network 110, which is formed using cloud based physical and virtual assets. The hybrid cloud network 110 can include, for example, Internet connectivity 125, content provider(s) 135, 140, e-commerce partners 145, and Personal Cloud Virtual Lan (PCVL) 120.

The Internet connectivity 125 provides a low level (and not necessarily secure) ubiquitous connectivity over which VPNs (encrypted, secure, managed, logical pipes) provide direct communications with a virtual secure environment.

The content providers(s) such as Internet Service Providers 135 and Television Service Provider 140 provide service content over VPN lines 130 to the hybrid cloud network 110 where the distribution of content can be managed via cloud based service provider 135. The Internet Service Providers 135 is an organization that provides services accessing and using the Internet. The Television Service Provider 140 can include a PayTV service with IP based transmission.

The E-Commerce Service Provider 145 can include any trade vendor with online shopping or commerce services. The E-commerce partners 145 can connect to the hybrid cloud network 110 via secure VPN connections 130 to provide secure portals to support direct customer access to shopping interfaces. Customers do not need to access public web interfaces to perform e-commerce operations.

The PCVL 120 provides consumer rented/leased virtual network and compute assets that enhance the home or business IT capability. Consumer owned devices 150 within a Home Area Network (HAN) 155 can also join the hybrid cloud network 110 using VPN pipes 130. The PCVL 120 can include a collection of digital content and services structured in the case of this application as a LAN type of network structure. The PCVL 120 network interconnects virtual machines within a limited area of the Personal Cloud defined by a TCP/IP address scope.

In FIG. 1, the hybrid cloud network 110 can be configured to include overlapping segments that form a managed service (indicated by reference numeral 105) with the overlapping sub-cloud segments 120. The sub-cloud segments 120 represent different areas of access, ownership, and service management. For example, members (such as Home Area Networks 155), also Internet Service Provider(s) 135, commerce service provider(s) 145, and content provider/tv station 140 can gain access to the various parts of the hybrid cloud network 110 using secure VPN connections 130. The Internet 115 is a public network. It is well-known that the Internet 115 is a global system of interconnected computer networks that use the Internet protocol suite (TCP/IP) to link devices globally. The Home Area Network (HAN) 155 can include any type of computer network that facilitates communication among devices 150 within the home. These devices 150 aim to make the installation, configuration, and management of a home network as automated, user friendly, and "plug-and-play" as possible.

In various embodiments, the hybrid cloud network 110 can consist of public access, private access or a combination of both public and private access. In the example shown in FIG. 1, the hybrid cloud network 110 is depicted including both public and private access. The hybrid cloud network 110 can be configured as a distributed network composing of at least two clouds (private, community or public) that remain distinct entities but are bound together, offering the benefits of multiple deployment models. Hybrid cloud network 110 can also mean the ability to connect collocation, managed and/or dedicated services with distributed cloud resources.

In most circumstances, customers will prefer to protect their data from access by other parties residing on this same network layer. In order to assure privacy within the hybrid cloud network 110, a smaller (sub network) can be created and maintained with data hosted securely; "walled-off" from the hybrid cloud network 110. These smaller, sub networks are configured as Personal Cloud Virtual LANs (PCVL) 120 where a virtual private network (a network within a network) can be established where traffic within the PCVL 120 is encrypted and encapsulated to preserve privacy securing hosted data. In the preferred embodiment, each PCVL 120 can be managed from outside of the PCVL 120. To maintain the PCVL's secure integrity and the durability of its security, it is suggested that only secure encrypted tunnels 130 are the preferred manner for remote accessibility. One or more or all access points to PCVL 120 can be provided via secure encrypted ethernet transport.

Figure 2:
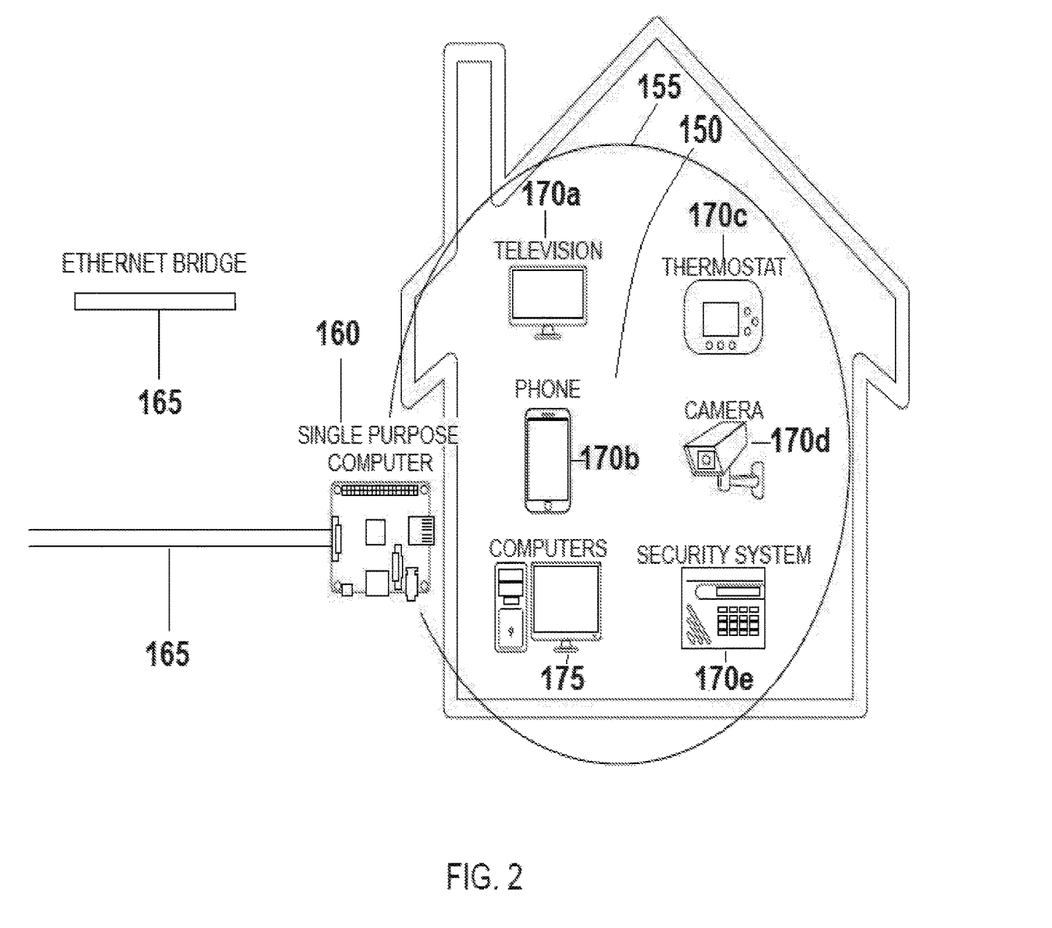
FIG. 2 is a diagram illustrating a Home Area Network (HAN) in accordance with the present teachings.

FIG. 2 illustrates a diagram that depicts an example of a detailed description of a Home Area Network (HAN) 155 which is private and connected through a single purpose computer 160. The single purpose computer 160 can be any device used for connecting a LAN to at least one WAN address, mapping Internet ports in a network address translation (NAT), routing and acting as a VPN connection or server on a LAN side of a network. The single purpose computer 160 functions as a gateway, router and VPN endpoint to the PCVL 120. In FIG. 2, the single purpose computer 160 serves the topology with dual functions: (a) it acts as a gateway for the HAN 155 and (b) it establishes a site-to-site secure connection with the PCVL 120 cross the public network of the Internet 115. The single purpose computer 160 can be configured to constantly direct all traffic (stove-piping) from the HAN 155 to the PCVL 120.

The connection of the single purpose computer couples the HAN 155 with PCVL 120. The HAN 155 and the PCVL 120 are different private LAN-type of network structures, wherein the HAN 155 is located within a office or residence and the PCVL 120 is located within a data center, such that they are geo-located in different locations. The flexibility of the Hybrid Cloud Network 110 (i.e., distributed network) can be expanded to the HAN 155 and can implement new scalability and services through the VPN connection 130 via a secure virtual ethernet bridge (VEC) 165. The VEC bridge 165 is a connection of at least two IP addresses where traffic is directly connected and shared between the two connected points. This two-way network VEC bridge 165 joins these the two networks (the HAN 155 with the Hybrid Cloud Network 110) so they can operate or appear as a single scalable network. Being modeled as a single scalable network enables users to obtain the benefits of a distributed network with the HAN 155 being directly connected to the private network a segment of the PCVL (120).

FIG. 2 also depict examples of consumer owned devices 150 that may be included within the HAN 155. The devices depicted are various examples of smart devices that can join and become part of the private network infrastructure. The devices 150 may include, for example, a television 170*a*, a phone 170*b*, a thermostat 170*c*, a camera 170*d*, security system 170*e*, and computer 175.

Television 170*a* can be, for example, an Internet Protocol television (IPTV) that is capable of delivering Video content over Internet Protocol (IP) networks as a managed service. Phone 170*b* can be, for example, a mobile phone service that is provided as a managed service. Thermostat 170*c* can be, for example, one or more environment controls provided as IP controlled devices. Camera 170*d* and security system 170*e* can provide, for example, IP based surveillance and monitoring. Computer 175 can be, for example, a personal computer. Those skilled in the art would recognize that the above list is not an exclusive one.

The consumer devices 150 can be programmed such that they can utilize the same, a different or a combination of security schemes and security protection levels. Traditionally, data-centric equipment such as computers 175 and media players are the primary components of a home network or HAN 155. A router (residential gateway) manages network layer connectivity between a Wide-Area-Network (WAN) and the HAN 155. Most home gateways perform key functions such as IP address assignment to devices (170*a-e* and 175) and network address translation, enabling multiple devices to share the home's single WAN address. These devices (170*a-e* and 175) aim to make the installation, configuration, and management of a home network as automated, user friendly, and "plug-and-play" as possible. Bridging two Local-Area Networks (LANs) together via a Layer 2 (OSI Model) via VEC bridge 165 is a way to construct a LAN-to-LAN VPN. One exemplary LAN centric network is described as a HAN 155 gaining Internet connectivity through standard WiFi components as an Internet Gateway device.

Figure 3:
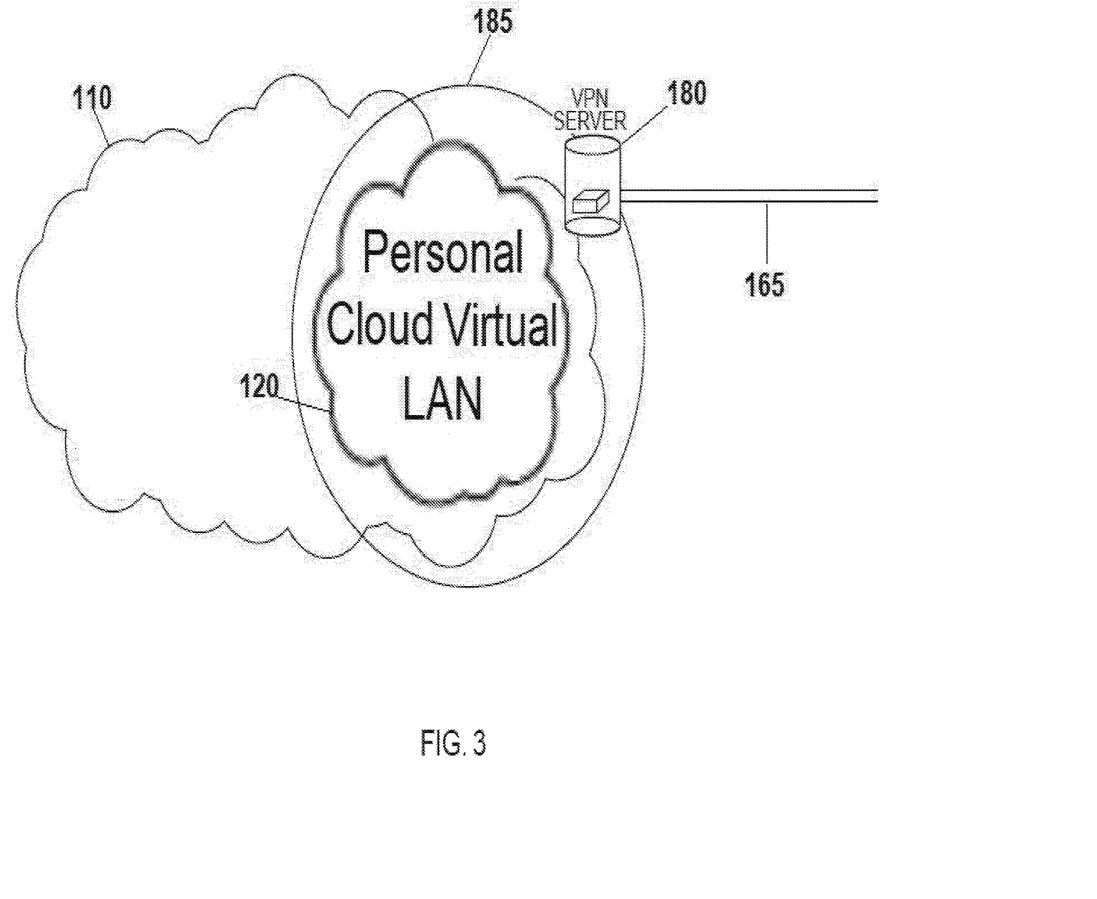
FIG. 3 is a diagram illustrating a Personal Cloud Virtual LAN (PCVL) side of a VPN tunnel according to the present teachings.

This VEC bridge 165 can extend between a Virtual Private Network Server (VPN Server 180) (contained in the PCVL 120 as shown in FIG. 3) and a physical network adapter contained within a single purpose computer 160 (FIG. 2). The Single Purpose Computer 160 most likely will be coupled to the device hosting the WAN (single Internet address) This diagram in FIG. 2 shows how a single purpose computer system 160 acts as a secure router to establish a "stove-piped" network connectivity for devices in a home or office. The connectivity uses open Internet communications as a basis for maintaining a VPN connection to the PCVL 120. The PCVL 120 augments the user's experience by providing security and proper network isolation for connected devices.

FIG. 3 illustrates a diagram that depicts the PCVL 120 hosted on a HCN 110 with many other customers hosted within the same cloud network. Because the data for each customer is individual and private, it is necessary to provide network protection from other customers residing on the hybrid cloud network side 110 of the VEC bridge 165 (also known as a VPN tunnel) as described in FIG. 2. The VPN server 185 sits inside an isolated subnet and acts as a gateway to other parts of the cloud infrastructure. The VPN server 185 can be as a virtual machine configured as an emulation of a computer system in software or hardware representing a server within a network architecture and there is a VPN server 185 residing on a virtual machine. In FIG. 3, a Layer 2 technique is represented by reference number 185 that allow for the coexistence of multiple LANs within a distributed network. This traffic within this network is encrypted and encapsulated from other networks.

Figure 4:
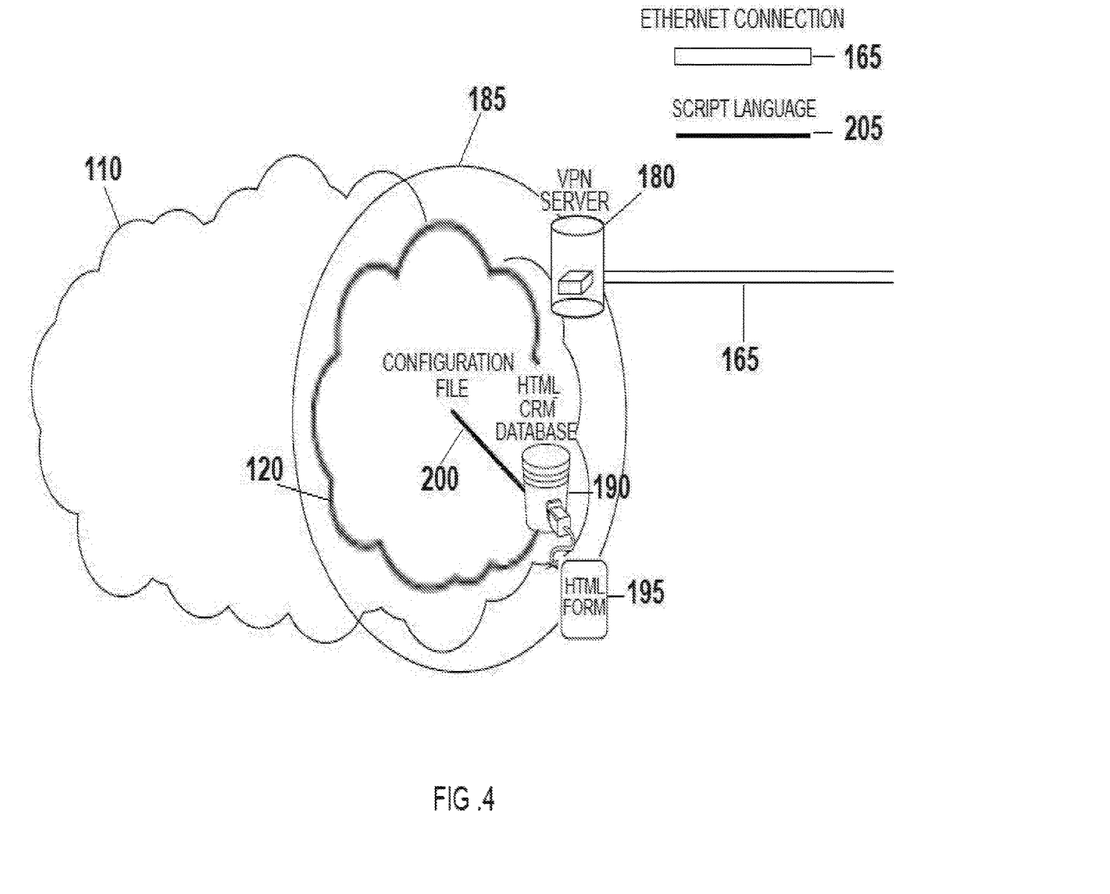
FIG. 4 is a diagram illustrating an automated configuration of the PCVL according to the present teachings.

FIG. 4 illustrates a diagram that depicts the automated configuration of the PCVL 120, which may include, for example, HTML CRM database 190, HTML form 195, and a configuration file 200 generated based on the input. The HTML Customer Relationship Management (CRM/CMDB) database 190 can be a database designed to manage current or potential customers with a repository archiving digital history and combining the digital history with information technology (IT) installations. The database 190 warehouses data relating to a collection of IT assets (commonly referred to as configuration items (CI)), as well as to descriptive relationships between such assets. The HTML form 195 is an input form that manages, updates CRM/CMDB database 190 with "field-to-field" input through program scripting.

The custom configuration file (text file) 200 can be generated by the CRM/CMDB database 190 that updates network elements and components native within the PCVL 120. Information managed by CRM/CMDB 190 is utilized by configuration Scripts 205 as input to provision the architecture of the HCN 110 and PCVL 120. Customer information is inputted as script language 205 from outside of the PCVL 120 via HTML customer enrollment forms 195 into the CRM/CMDB 190. The CRM/CMDB 190 can reside on a Virtual Computational Server 180 or some other Virtual Device.

Figure 5:
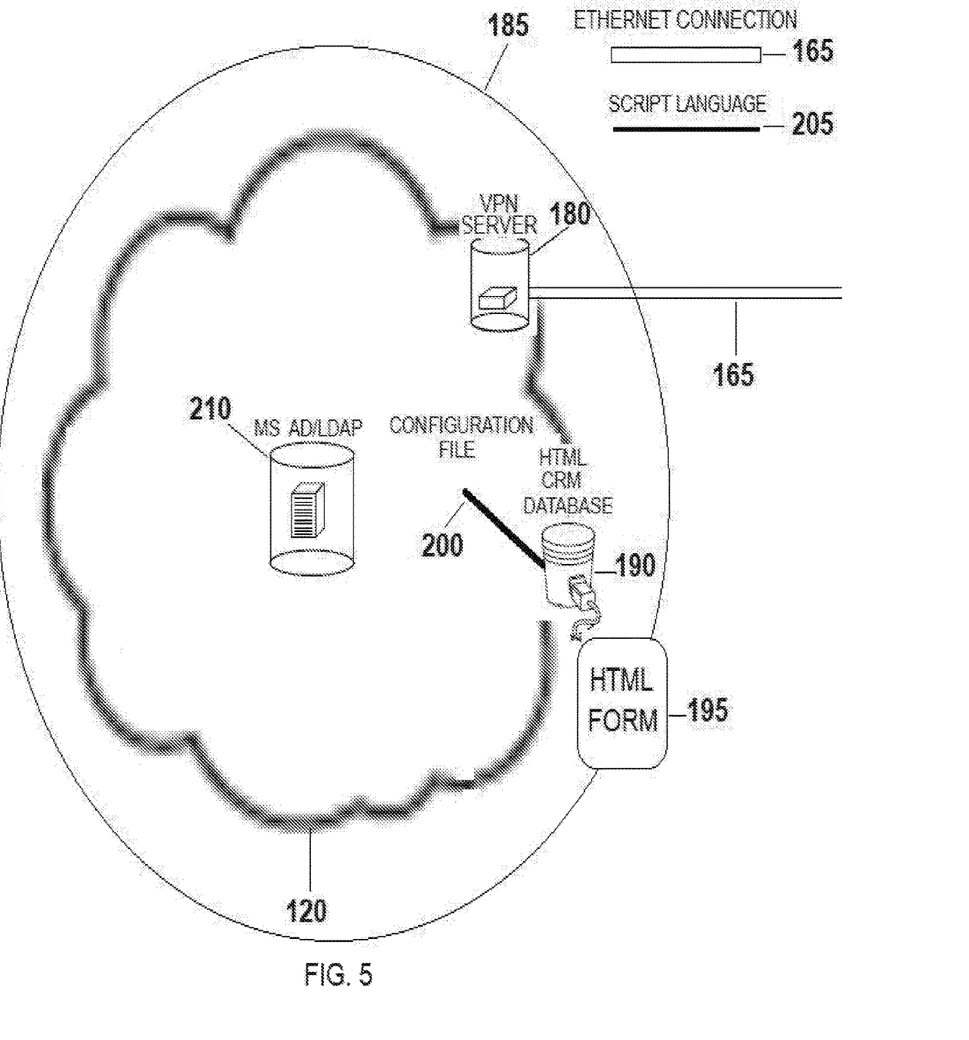
FIG. 5 is a diagram illustrating an addition of a user management server according to the present teachings.

In comparison to FIG. 4, FIG. 5 illustrates a diagram that depicts an addition of a user management server (Microsoft Active Directory MS AD or LDAP) 210. The MS AD and LDAP 210 can be configured to provide directory services for managing, accessing, and maintaining distributed directory information services over Internet Protocol (IP) networks. The MS AD and LDAP 210 can be present in the HCN 110 and or the PCVL 120 and be used to centrally manage many different user accounts recognized by the different network layers. In FIG. 5, VPN Network (in-the-cloud) 185 can be a VPN network within a network encapsulating and encrypting all traffic within the PCVL 120.

Figure 6:
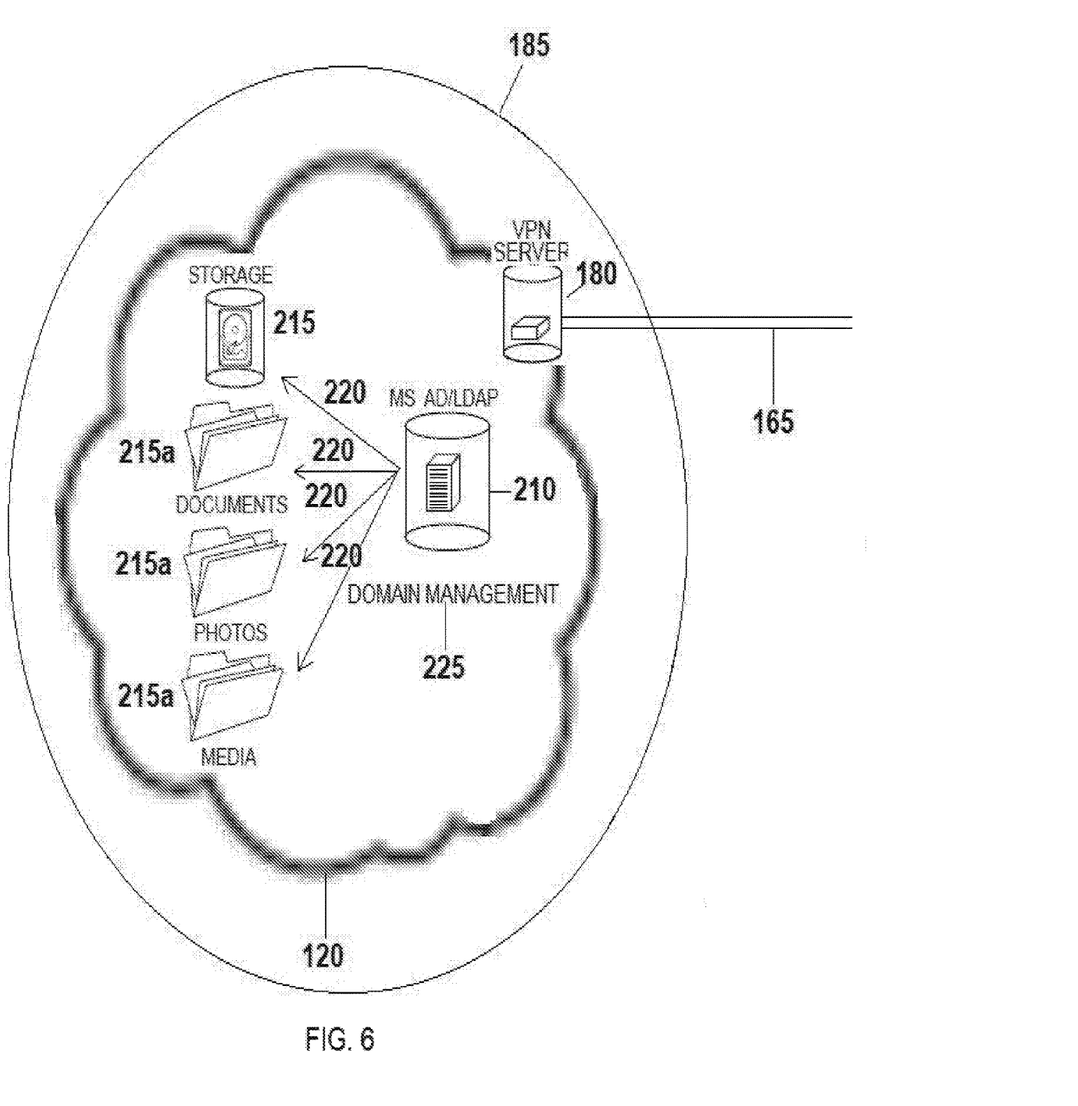
FIG. 6 is a diagram that depicts an example of the roles of the management server in accordance with the present teachings.

FIG. 6 illustrates a diagram that depicts the role of MS AD/LDAP 210 to centrally manage user accounts, storage directories 215a and virtual devices 180, 215, 230 (FIG. 7), 235 (FIG. 8) to various data services that exist in the PCVLAN. Storage 415 can be a virtual machine whose sole purpose is to store data and provide multiple clients on the network with access to the same files (store data). Storage directories 215a can be one or more data directories within a Virtual Storage Server that maps the names of network resources to their respective network addresses. Virtual device 230 may be a virtual computational server (FIG. 7), and virtual device 235 may be a virtual streaming server (FIG. 8). Domain management 225 can provide automated management of a user's identity and information between different network elements and resources.

Figure 7:
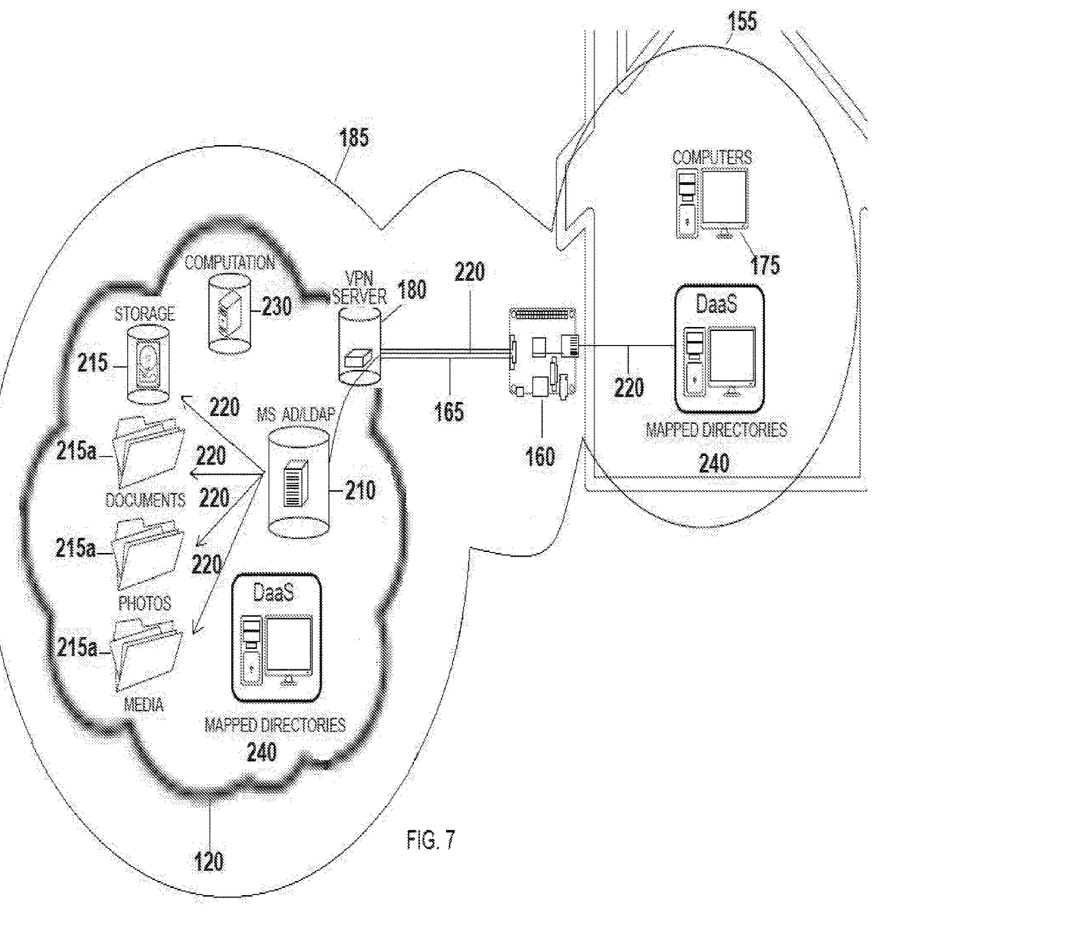
FIG. 7 is a diagram that illustrates an overview of the PCVL environment according to the present teachings.
Figure 8:
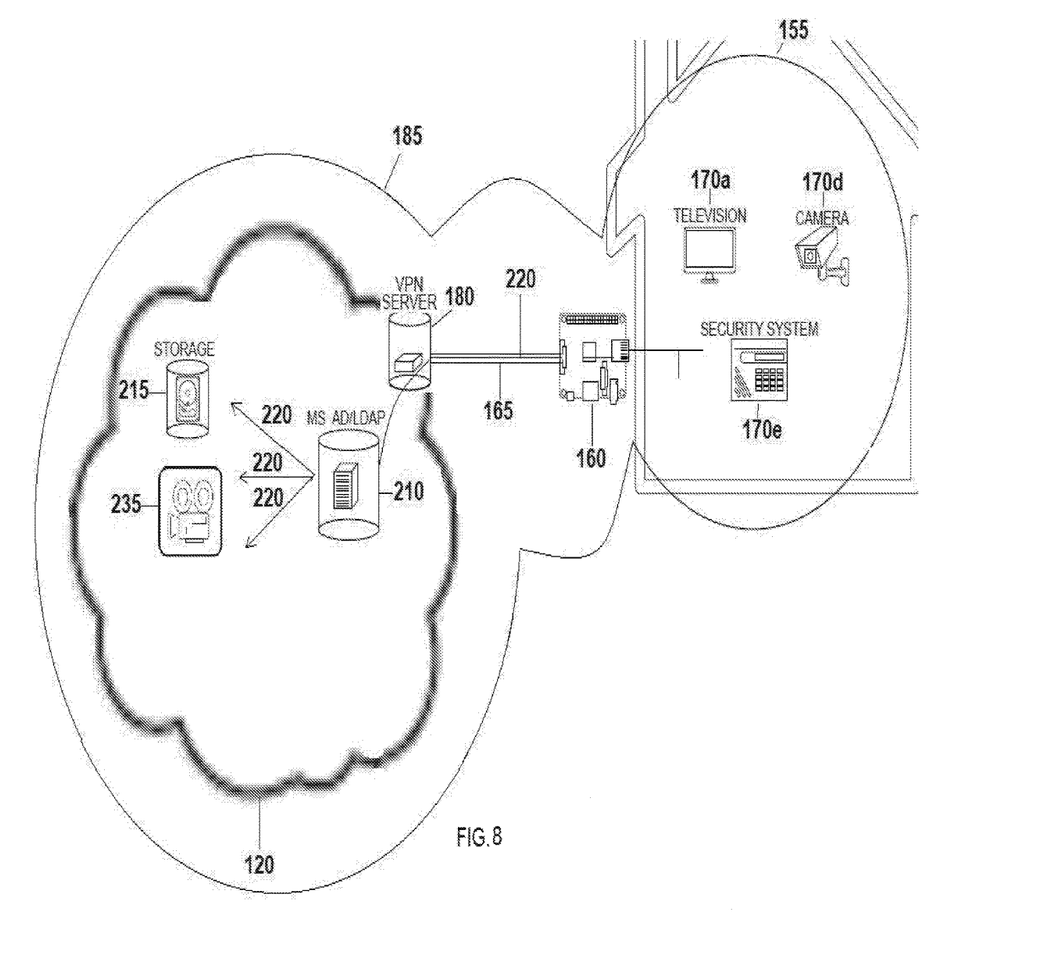
FIG. 8 is a diagram that depict video sinks and sources and physical security devices according to the present teachings.

FIG. 7 illustrates a diagram that depicts the overview of the PCVL 120 environment to include both VPN endpoints which are two different networks in two different locations acting as one network joined together via the Ethernet and VEC Bridge 165. It also depicts implementing additional service to the HAN 155 such as virtual desktop computer(s) (DaaS 240), IPTV etc. (various data services). As depicted in FIG. 7, it is possible to have Domain Management 225, originating from the PCVL 120 to manage devices and resources native within the HAN 155. Server management controlling virtual resources within the PCVL 120 can now manage physical devices in the HAN 155 via the VEC bridge 165.

FIG. 8 illustrates a diagram that extends FIG. 7 to depict video sinks and sources and physical security devices. Some new TVs and DVRs include integrated WiFi connectivity which allows the user to access Internet services such as Netflix® and YouTube®. TV shows and recorded media are often stored locally via digital media. This diagram depicts the possibility of storing recorded TV on PCVL 120 with play-back being retrieved from a remote location—Virtual Storage Server 215 hosted. This exemplary diagram in FIG. 8 can also provide a network structure for video security. Cameras 170d can be coupled to a larger security system where recorded video can reside in the PCVL 120. Vendor Security services can be provided access to stored video data. The stored video data can be solely managed by the consumer and not the vendor. See FIG. 9 for Service Provider access to PCVL 120.

Figure 9:
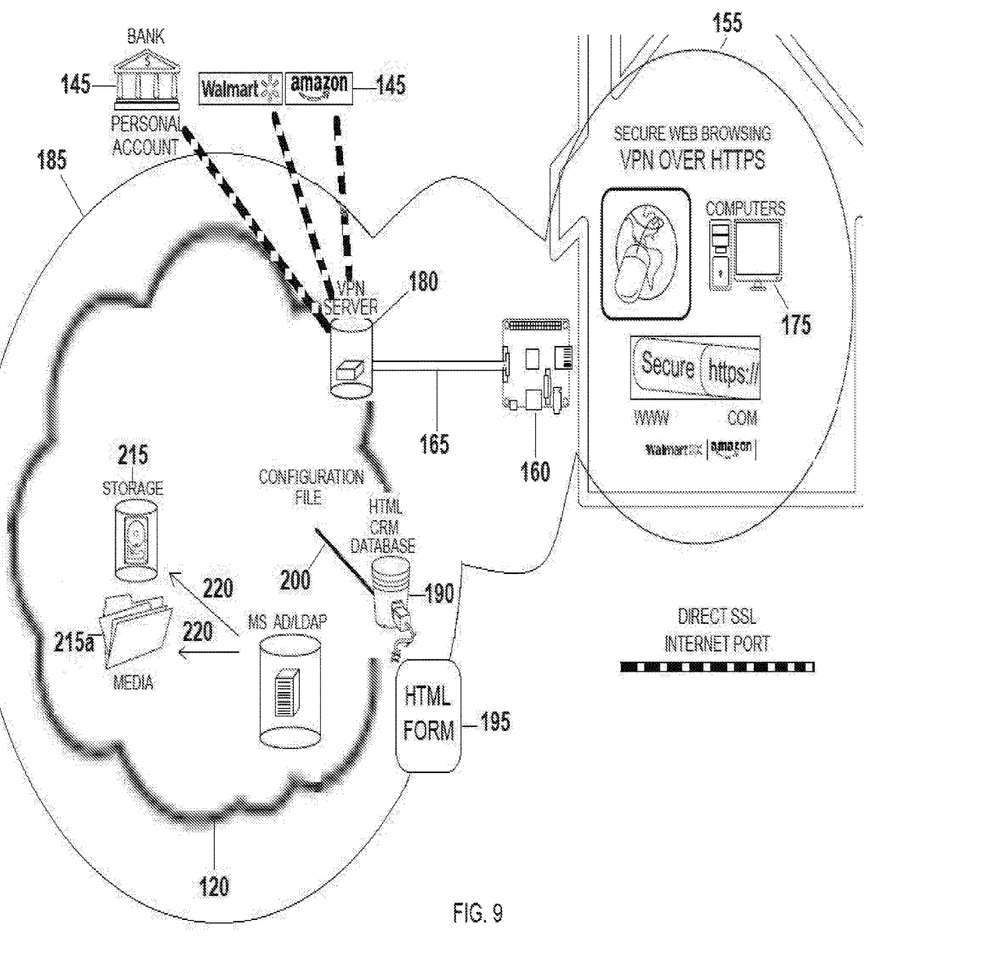
FIG. 9 is a diagram that illustrates another overview of the PCVL environment according to the present teachings.

FIG. 9 is a diagram that depicts the overview of the PCVL 120 to include Commerce Service Provider 145 access to both VPN networks HAN 155 and VPN Network (in-the-cloud). It also depicts that e-commerce service providers 145 can be added via open Internet ports within the Virtual Private Network Server (VPN Server) 185, direct VEC connections 165 to the Virtual Private Network Server (VPN Server) 185 or Internet 115 portal access to PCVL 120 to provide a secure private network experience. ACTIVEDI-RECTORY/LDAP SERVER 210 can provide access to Commerce Service Provider 145 to data, storage and resources that are managed. Instead of providing a Commerce Service Provider 145 access to all components, applications and services provided within the PCVL 120. Domain level management 225 can be configured to provide access to only the relevant data that is needed and not provide access to components, applications or services that includes data that is not needed.

Figure 10:
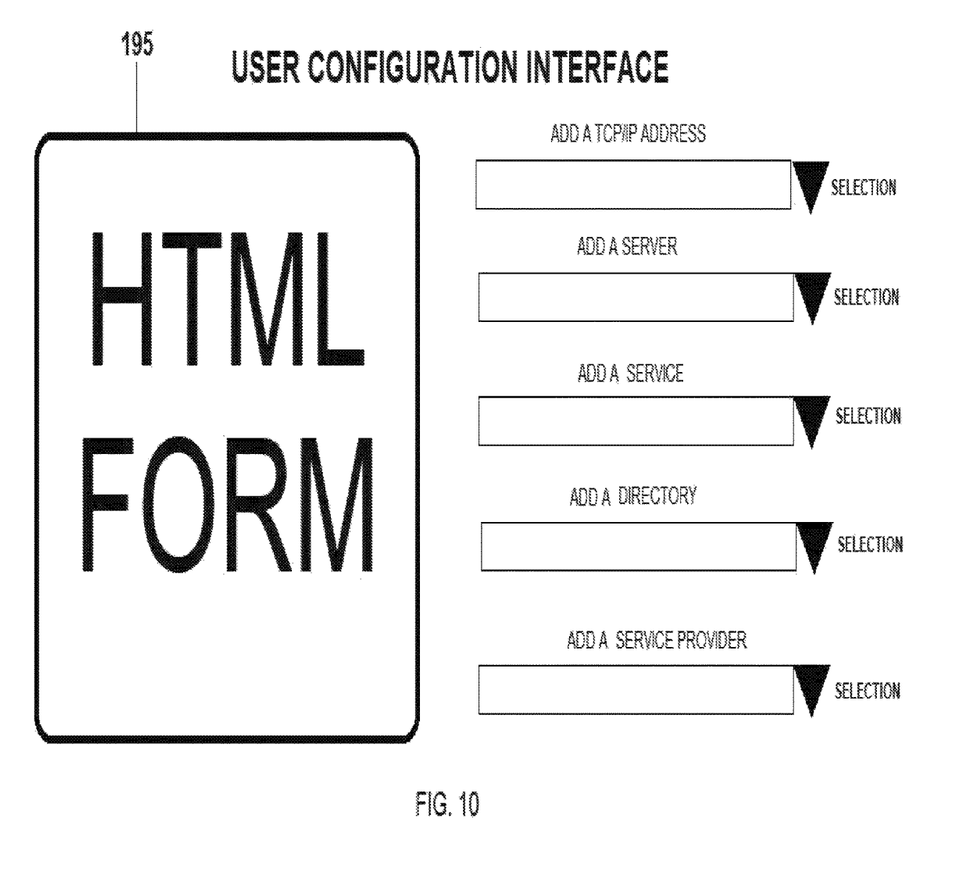
FIG. 10 depicts an example of a user management input form.
Figure 11:
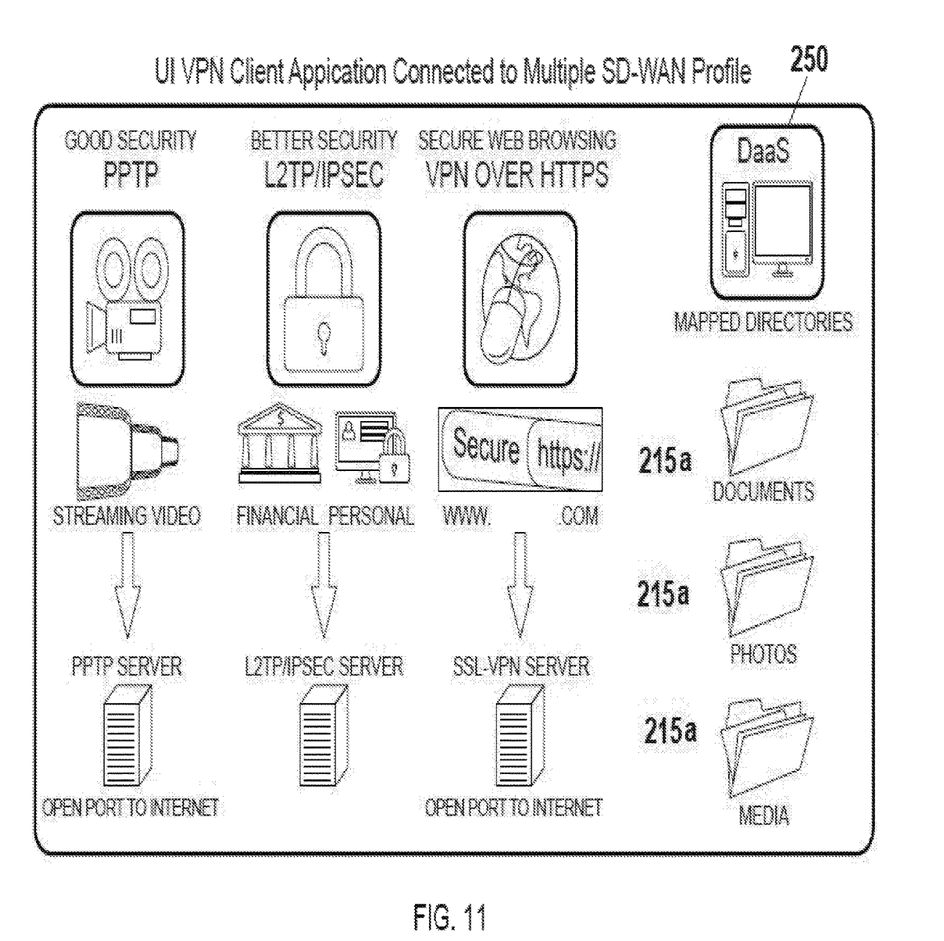
FIG. 11 depicts examples of various levels of VPN based security schemes according to the present teachings.

FIG. 10 depicts an example of a user management input form 195. The input form 195 can include various data fields to capture relevant user information FIG. 11 illustrates the various levels of VPN based security that may be used to secure the different types of data. The graphic in FIG. 11 demonstrates that multiple types of VPN pipes (or encryption types) may be used as appropriate based on performance requirements and sensitivity of data. This graphic may be a software client configuration program that can call up different transport types, services or resources from one central location via personal computer 175.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. A software module can comprise computer-executable instructions that cause a hardware processor to execute the computer-executable instructions. The computer-executable instructions can comprise a scripted computer language and/or a compiled computer language. Computer-executable instructions can comprise, for example and without limitation, JAVASCRIPT®, PYTHON™, php, SQL, C, C++, JAVA®, C#, Fortran, BASIC, shell scripts, Perl, or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes that come within the meaning and range of equivalency of the claims are to be embraced within their scope.

What is claimed is:

1. A system comprising:
a hybrid cloud network configured to include public access and private access;
one or more personal cloud virtual LANs provided at an overlapping segment of the hybrid cloud network to provide privacy within the hybrid cloud network; and
a home area network including a single purpose computer configured as a gateway for the hybrid cloud network and configured to establish a site-to-site secure connection with the one or more personal cloud virtual LANs.

* * * * *